United States Patent
McHugh et al.

(10) Patent No.: US 11,558,213 B1
(45) Date of Patent: Jan. 17, 2023

(54) DEEP TAGGING ARTIFACT REVIEW SESSION

(71) Applicant: INTERNATIONAL BUSINESS MACHINES CORPORATION, Armonk, NY (US)

(72) Inventors: Manus Kevin McHugh, Colorado Springs, CO (US); Schuyler Bruce Matthews, Cary, NC (US); Lisa Seacat DeLuca, Bozeman, MT (US); Sarika Budhiraja, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/393,585

(22) Filed: Aug. 4, 2021

(51) Int. Cl.
G06F 15/16 (2006.01)
H04L 12/18 (2006.01)
G11B 20/10 (2006.01)

(52) U.S. Cl.
CPC .... H04L 12/1831 (2013.01); G11B 20/10527 (2013.01); H04L 12/1822 (2013.01)

(58) Field of Classification Search
None
See application file for complete search history.

(56) References Cited

U.S. PATENT DOCUMENTS

| 8,504,361 | B2 | 8/2013 | Collobert | |
|---|---|---|---|---|
| 9,774,825 | B1 | 9/2017 | John | |
| 2012/0208167 | A1* | 8/2012 | Stowe | G06Q 10/06398 434/362 |
| 2012/0321062 | A1* | 12/2012 | Fitzsimmons | H04M 3/56 379/202.01 |
| 2013/0212507 | A1* | 8/2013 | Fedoseyeva | G06F 3/04842 715/765 |
| 2014/0169767 | A1* | 6/2014 | Goldberg | G11B 27/031 386/282 |
| 2017/0031677 | A1* | 2/2017 | Kumar | G06F 8/71 |
| 2018/0307770 | A1* | 10/2018 | Sadauskas, Jr. | G06F 16/31 |
| 2021/0076105 | A1* | 3/2021 | Parmar | G06F 3/048 |

FOREIGN PATENT DOCUMENTS

CA    3090676 A1 *  2/2021  ......... G06Q 10/1095

OTHER PUBLICATIONS

Disclosed Anonymously, "Cognitive Meeting Assistant: A Method for Capturing, Analyzing, and Organizing Meeting Transcripts," IPCOM000248606D, IP.com, Dec. 21, 2016, 5 pages.
Disclosed Anonymously, "System for Individualistic Meeting Minutes Consolidation with Intelligent Categorization and Querying Mechanism," IPCOM000236358D, Apr. 22, 2014, 4 pages.
(Continued)

Primary Examiner — Phyllis A Book
(74) Attorney, Agent, or Firm — Rakesh Roy

(57) ABSTRACT

A method, computer system, and a computer program product for deep tagging a recorded review session is provided. The present invention may include identifying a recording segment referencing an artifact in a recorded review session. The present invention may also include generating a bi-directional link between the identified recording segment and the referenced artifact.

14 Claims, 11 Drawing Sheets

(56) References Cited

OTHER PUBLICATIONS

Tur, et al., "The CALO Meeting Assistant System," IEEE Transactions on Audio, Speech, and Language Processing 18.6 (2010): 1601-1611.
Mell et al., "The NIST Definition of Cloud Computing", Recommendations of the National Institute of Standards and Technology, NIST Special Publication 800-145, Sep. 2011, 7 pages.
Deluca et al., "Deep Tagged Source Code Issue Management" Application and Drawings, Filed on Apr. 12, 2021, 29 Pages, U.S. Appl. No. 17/227,433.

* cited by examiner

DEEP TAGGING ARTIFACT REVIEW SESSION

BACKGROUND

The present invention relates generally to the field of computing, and more particularly to engineering lifecycle management.

Software development is a collaborative process relying on the efforts of cross-discipline teams. With software development projects, it is common practice to share and review the work done by each team on regular intervals. These review sessions enable stakeholders to understand the work in progress, facilitate the communication of architecture and design, speed decision-making, and improve the quality of the project. However, often times, scheduling conflicts may prevent a project collaborator or other stakeholder from attending one or more review sessions. Current solutions lack the ability to capture the discussions from these review sessions in a meaningful way for anyone who was not able to attend.

SUMMARY

Embodiments of the present invention disclose a method, computer system, and a computer program product for deep tagging a recorded review session. The present invention may include identifying a recording segment referencing an artifact in a recorded review session. The present invention may also include generating a bi-directional link between the identified recording segment and the referenced artifact.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
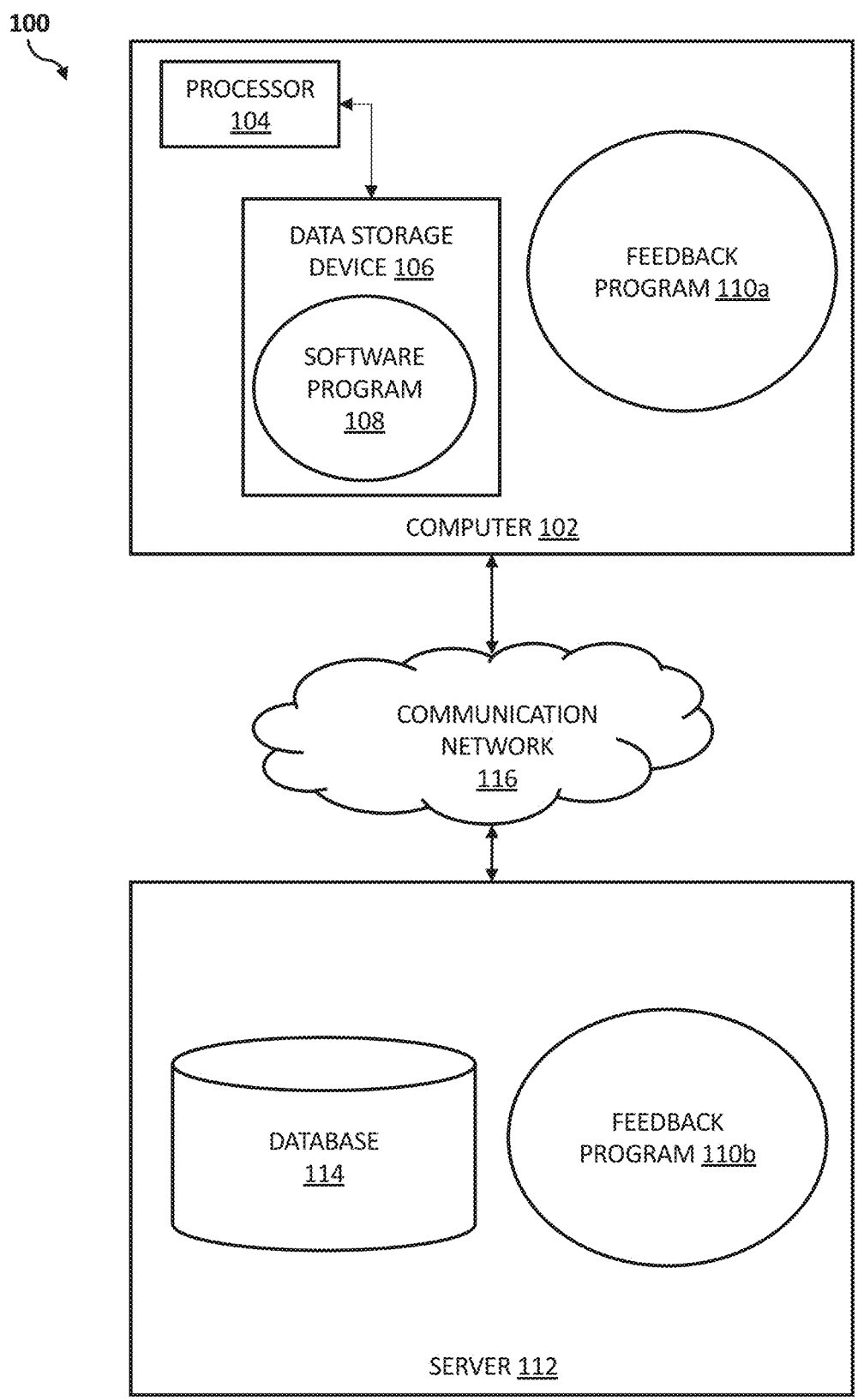
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for deep tagging a review session to facilitate access from the review session to particular software architecture and design artifacts (hereinafter referred to as "artifacts") referenced (e.g., discussed) therein. Although the embodiments below describe deep tagging a recorded review session, it is contemplated that the disclosed embodiments may also apply to deep tagging a live review session stream (e.g., live audio/video stream). Accordingly, any reference to a recorded review session may also include a live review session stream and any reference to a recording segment may also include a live segment of the live review session stream.

As such, the present embodiment has the capacity to improve the technical field of engineering lifecycle management and provide feedback with more context, by linking conversation streams of a review session referencing a particular artifact (e.g., providing feedback on the work product) to the corresponding artifact within a native tool associated with the artifact (e.g., artifact viewing/editing tool). More specifically, a feedback program may record a review session referencing one or more artifacts of a software development project. Then, the feedback program may associate the recorded review session with a repository storing the referenced artifacts. Next, the feedback program may identify one or more segments of the recorded review session referring to the artifact. Then, the feedback program may tag the recording segment referring to the artifact (e.g., timestamp) with a link to the corresponding artifact within an artifact viewing/editing tool and tag the corresponding artifact within the artifact viewing/editing tool with a link to the recording segment referring to the artifact. Thereafter, the feedback program may present the tagged recorded review session (e.g., in playback tool) with links to directly access the artifact within the artifact viewing/editing tool and present the tagged artifact (e.g., in the artifact viewing/editing tool) with links to the recording segment.

As described previously, software development is a collaborative process relying on the efforts of cross-discipline teams. With software development projects, it is common practice to share and review the work done by each team on regular intervals. These review sessions enable stakeholders to understand the work in progress, facilitate the communication of requirements, speed decision-making, and improve the quality of the project. However, often times, scheduling conflicts may prevent a project collaborator or other stakeholder from attending one or more review sessions. Current solutions lack the ability to capture the discussions from these review sessions in a meaningful way for anyone who was not able to attend. Further, current solutions lack an automated method to identify the specific artifacts referenced in a review session to enable those who did not attend the review session to quickly navigate to the specific artifact without traversing the entire recording of the review session.

Given the ability to record or live stream review sessions hosted over a web conferencing tool, it may be advantageous to, among other things, provide a way to automatically generate a bi-directional link between a segment of the review session referring to an artifact and the corresponding artifact within the artifact viewing/editing tool. It may be advantageous to provide an end user, working with the corresponding artifact within the artifact viewing/editing tool, with a link to the review session segment referring to the corresponding artifact. It may also be advantageous to provide the end user, working with the review session within a playback tool, with a link to the corresponding artifact within the artifact viewing/editing tool.

Software development projects may often include a software architecture stage and a software design stage. The software architecture stage may focus on developing a high-level infrastructure of software that matches business and technical requirements. The software design stage may focus on the system's implementation of the requirements and delve into how the various elements of the system may work together to fulfill those requirements. Although the stages of software architecture and software design may include some differences, the disclosed embodiments consider architecture and design to be part of the same domain and problem set. Thus, any solutions described in this disclosure may apply equally to software architecture and software design.

According to one embodiment, the work products or by-products generated and used during the process of software development (e.g., software architecture; software design) may include design and architecture artifacts ("artifacts"). An artifact, as disclosed herein, may help describe the function, architecture, and design of software and include one or more documents, diagrams, and/or models. For example, artifacts may include documents, such as, requirements documents, business case documents, and software architecture documents. In another embodiment, an artifact may include one or more models, such as, for example, use-case models, analysis models, and design models. Other examples of artifacts may include personas, frames, prototypes, usability test reports, data models, and setup scripts.

According to one embodiment, a model may provide an abstract representation of a system and include one or more model elements (also an artifact), such as, for example, actors, use cases, and classes. In one embodiment, a model may include one or more diagrams and diagram elements configured to illustrate the quantifiable aspects of a system which can be described visually, such as, for example, relationships, behavior, structure, and functionality. According to one embodiment, the diagrams of a model may include, for example, structure diagrams (e.g., what should/must be in the system), behavior diagrams (e.g., what should/must happen in the system), and interaction diagrams (e.g., what is the flow of control and data among the things in the system).

According to one embodiment, model and diagram-based artifacts may be created using visual modeling languages, such as, for example, the Unified Modeling Language (UML®) (UML and all UML-based trademarks and logos are trademarks or registered trademarks of Object Management Group, Inc. and/or its affiliates) and Systems Modeling Language (SysML®) (SysML and all SysML-based trademarks and logos are trademarks or registered trademarks of Object Management Group, Inc. and/or its affiliates). Visual modeling tools may enable users to utilize UML® and SysML® notations to generate modeling and diagram artifacts to help describe the function, architecture, and design of various products and systems.

Although the artifacts described in the embodiments and examples of this disclosure illustrate model and diagram-based artifacts (e.g., graphical artifacts), it is contemplated that the disclosed feedback program may enable bi-directional deep tagging between a recorded review session referencing any type of artifacts.

According to one embodiment, all of the artifacts generated during a software development project may be located in a central repository (e.g., an artifact management repository). According to one embodiment, the artifact management repository may be stored on a local server and/or on a remote server and may provide web-based access to the stored artifacts for the relevant stakeholders. In one embodiment, the artifact management repository may provide version control to keep track of when each artifact is generated and apply a version number when a new version of a given artifact is added to the artifact management repository.

According to one embodiment, a user may only be interested in a specific artifact and may want to know when it was discussed during a review session that the user was not able to attend. The feedback program may eliminate the need for the user, who is only interested in a specific artifact, to record, watch, and playback an entire review session by facilitating access to excerpts or segments of the recorded review session corresponding to that specific artifact. As such, the feedback program may allow a system to save considerable computational resources by only transferring and presenting content related to a specific artifact rather than transferring and presenting an entire recorded review session, allowing the system to utilize the saved computational resources for other tasks.

According to one embodiment, the feedback program may also include user experience enhancements where a graphical artifact view, such as, a SysML® block diagram, may be annotated with a comment box incorporating a link to a specific timestamp of the recorded review session to enable the user to understand the comment in the correct context. In one embodiment, the feedback program may also include in the comment box, a short textual feedback and/or thumbnail image extracted from the recording.

According to one embodiment, the feedback program may facilitate access to a segment of a recorded review session corresponding to an identified version of an artifact that can be found in and represented in a hierarchical structure (e.g., artifact management repository). In one embodiment, the feedback program may implement a machine learning model to analyze speech and/or text to determine a version corresponding to the artifacts referenced in the review session.

According to one embodiment, the feedback program may provide a user interface (UI) which may enable a user, interacting with the recorded review session, to select a segment of a recorded review session referencing an artifact. In one embodiment, responsive to the user utilizing the UI and selecting the segment of the recorded review session referencing the artifact, the feedback program may display a representation of a pertinent version of the referenced artifact.

According to one embodiment, the UI of the feedback program may enable a user to select recording entries (e.g., timestamps in the recorded review session) associated with one or more artifacts in an artifact viewing/editing tool. Responsive to the user utilizing the UI and selecting the recording entries, the feedback program may automatically replay the segments of recorded review session corresponding to the selected recording entries. According to one embodiment, the UI of the feedback program may enable a user to select an option to replay all segments of the recorded review session related to a selected artifact. Responsive to the user utilizing the UI to select the option to replay all segments of the recorded review session related to the selected artifact, the feedback program may automatically replay each segment containing the selected artifact.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a feedback program 110a. The networked computer environment 100 may also include a server 112 that is enabled to run a feedback program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the feedback program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the feedback program 110a, 110b (respectively) to automatically create a bi-directional link between a recording segment referring to an artifact and the artifact to facilitate access to the artifact from the recording segment and to facilitate access to the recording segment from the artifact. The disclosed embodiments are explained in more detail below with reference to FIGS. 2 to 8.

Figure 2:
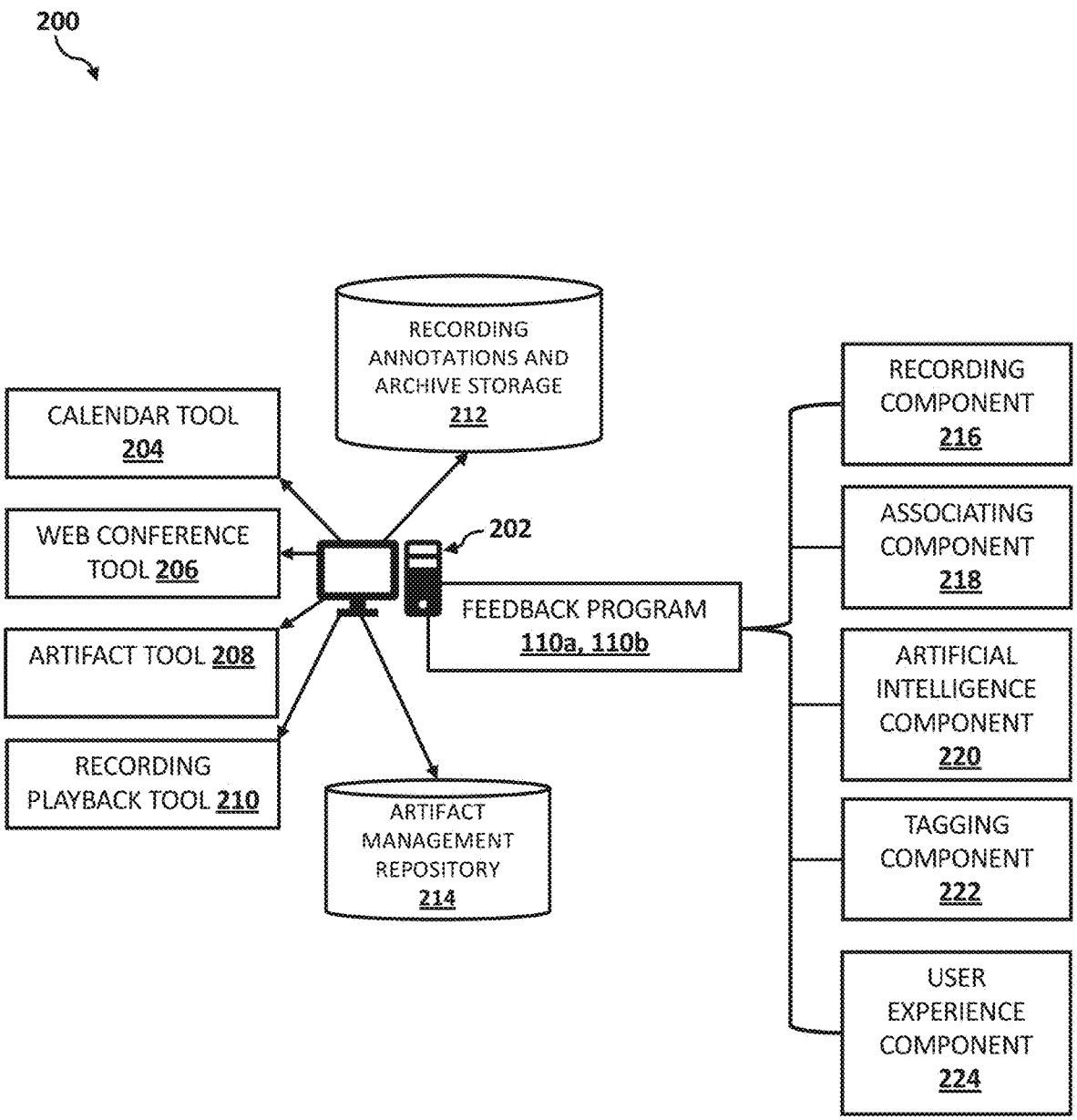
FIG. 2 is schematic block diagram of a engineering lifecycle management environment according to at least one embodiment.

Referring now to FIG. 2, a schematic block diagram of an engineering lifecycle management environment 200 implementing the feedback program 110a, 110b according to at least one embodiment is depicted. According to one embodiment, the engineering lifecycle management environment 200 may include one or more components (e.g., client computer 102; server computer 112; communication network 116) of the computer environment 100 discussed above with reference to FIG. 1.

According to one embodiment, the engineering lifecycle management environment 200 may include a computer system 202 having a tangible storage device and a processor that is enabled to run the feedback program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smart telephone, a smart watch or other smart wearable, or other electronic devices.

According to one embodiment, the feedback program 110a, 110b may be configured to interact with a calendar tool 204, a web conference tool 206, an artifact tool 208, a recording playback tool 210, a recording storage 212 (e.g., recording annotations and archive storage), and an artifact management repository 214 in the engineering lifecycle management environment 200, as will be further detailed below. According to one embodiment, the computer system 202 may implement the calendar tool 204, web conference tool 206, artifact tool 208, and recording playback tool 210 in distributed cloud computing environments where tasks may be performed by remote processing devices which may be linked through the communication network 116.

According to one embodiment, the calendar tool 204 may include one or more programs configured to enable a user to coordinate and schedule a meeting for a review session via a web conference.

According to one embodiment, the web conference tool 206 may include one or more programs configured to enable a user to coordinate, present, and record a review session (e.g., video conference) with one or more collaborators, participants, and/or other relevant stakeholders. In one embodiment, the feedback program 110a, 110b may utilize or direct the web conference tool 206 to record and store the review session in the recording storage 212 (e.g., recording annotations and archive storage). In another embodiment, the feedback program 110a, 110b may also utilize or direct the web conference tool 206 to insert tags or links in a review session recording segment referencing an artifact to direct a user from the recorded review session segment to the referenced artifact via the artifact tool 208, as will be discussed further below.

According to one embodiment, the recording playback tool 210 may include a stand-alone tool or may be part of the web conference tool 206 and be configured to enable a user to consume (e.g., view and/or listen) a playback of the recorded review session. In one embodiment, the feedback program 110a, 110b may also utilize or direct the recording playback tool 210 to display, at the segments (e.g., timestamps) of the recorded review session (e.g., recorded video and/or audio conference), tags or links to the referenced artifacts.

According to one embodiment, the artifact tool 208 may include a software application for viewing and/or editing an artifact. In one embodiment, the artifact tool 208 may vary depending on the file type of the artifact (e.g., word document, image, graphical) and may include a tool that is native for viewing and/or editing that file type. For example, when the artifacts are graphical artifacts as illustrated in the figures, the artifact tool 208 may include a visual modeling tool configured to utilize a general-purpose modeling language, such as, UML® and SysML® to generate the graphical artifacts. In one embodiment, the visual modeling tool may include IBM Rhapsody® (IBM Rhapsody and all IBM Rhapsody-based trademarks and logos are trademarks or registered trademarks of International Business Machines Corporation and/or its its affiliates). In one embodiment, the feedback program 110a, 110b may also utilize or direct the artifact tool 208 to annotate a specific artifact or artifact element (e.g., subcomponent of the artifact) with a tag or link to a segment of the recorded review session, which may direct a user to a relevant excerpt or segment of the recorded review session (e.g., via the recording playback tool 210) referencing that specific artifact or artifact element.

According to one embodiment, the artifacts generated (e.g., using the artifact tool 208) during a software development project may be located in the artifact management repository 214. In at least one embodiment, the artifact management repository 214 may be hierarchically organized based on various parameters such as, for example, artifact type, artifact identifier (e.g., global unique identifier (GUID)), name, namespace, version, model, component hierarchy). In one embodiment, the artifact management repository 214 may provide revision and version control to keep track of when each artifact is generated and apply a version number when a new version of a given artifact is added to the artifact management repository. In one embodiment, the artifact management repository 214 may also provide an indication of the project collaborators for each artifact and track artifact feedback for each collaborator.

According to one embodiment, the recording storage 212 and the artifact management repository 214 may be distributed over multiple data storage devices (e.g., data storage device 106; database 114) included in the electronic devices (e.g., client computer 102; server computer 112) of the computer system 202 in the engineering lifecycle management environment 200, over multiple data storage devices (e.g., data storage device 106; database 114) external to the electronic devices of the computer system 202 in the engineering lifecycle management environment 200, or a combination thereof. In other embodiments, the recording storage 212 and the artifact management repository 214 may be remote, such as on another server available via communication network 116. According to one embodiment, the artifact management repository 214 may provide web-based access to the stored artifacts for the relevant stakeholders.

According to at least one embodiment, the feedback program 110a, 110b may include a single computer program or multiple program components/modules or sets of instructions being executed by the processor of the computer system 202. The feedback program 110a, 110b may include routines, objects, components, units, logic, data structures, and actions that may perform particular tasks or implement particular abstract data types. The feedback program 110a, 110b may be practiced in distributed cloud computing environments where tasks may be performed by remote processing devices which may be linked through the communication network 116. In one embodiment, the feedback program 110a, 110b may include program instructions that may be collectively stored on one or more computer-readable storage media. As shown in the illustrated embodiment of FIG. 2, the feedback program 110a, 110b may include a recording component 216, an associating component 218, and artificial intelligence (AI) component 220, a tagging component 222, and a user experience (UX) component 224.

According to one embodiment, the feedback program 110a, 110b may implement the recording component 216 to record a review session (e.g., audio and/or video conference) conducted via the web conference tool 206. In one embodiment, the recording component 216 may initiate recording responsive to detecting a review session (e.g., detecting the start of a scheduled web conference between a plurality of engineers). In another embodiment, the recording component 216 may record video and/or audio associated with an ongoing review session. In this embodiment, the recording component 216 may capture (e.g., record) and maintain (e.g., store) a video, audio, and textual chat stream associated with the ongoing review session in the recording storage 212. According to at least one embodiment, the recording component 216 may maintain a list of all participants in the recorded review session, each with associated participant information such as contributor status, contributor role, related projects, and associated artifact repositories.

According to one embodiment, the feedback program 110a, 110b may implement the associating component 218 to associate a recorded review session with one or more repositories (e.g., artifact management repository 214) storing the referenced artifacts. In an embodiment, the associating component 218 may identify one or more artifact management repositories 214 related to the recorded review session by utilizing metadata to identify review session participants and artifact stakeholders. More specifically, the feedback program 110a, 110b may compare the list of all invited participants in the meeting invite (e.g., via calendar tool 204) and/or participants in the recorded review session with a list of contributors associated with one or more artifact management repositories 214. For example, responsive to the associating component 218 determining that each of the participants in the recorded review session are also contributors associated with the artifact management repository 214 storing a given artifact, the associating component 218 may associate the recorded review session with that artifact management repository 214. In another embodiment, a user, contributor, and/or participant may provide the related artifact management repository 214 as part of the meeting details via the calendar tool 204 or web conference tool 206.

According to one embodiment, the feedback program 110a, 110b may implement the AI component 220 to recognize the artifacts referenced during the recorded review session and generate a detailed association between those segments (e.g., timestamps) in the recording with the corresponding artifacts in the artifact management repository 214. According to one embodiment, the AI component 220 may utilize deep learning techniques to train, calculate weights, ingest inputs, and output a plurality of solution vectors. In this embodiment, inputs may include audio sessions, audio session excerpts or segments, video sessions, video session excerpts or segments, audio extracted from a video session or segment, text (e.g., conversational text from video/audio session participants, text within video/audio content, chat stream) extracted from a video/audio session or segment, and video or images extracted from a video session or segment. In one embodiment, the solution vectors may include related artifact management repositories 214, design/architecture artifacts and/or artifact elements associated with probabilistic values. According to one embodiment, the AI component 220 may apply a machine learning model to identify the one or more artifacts referenced within the review session and associate the referenced one or more artifacts with the one or more corresponding artifacts contained in the artifact management repository 214. In various embodiments, the AI component 220 may include any combination of deep learning models, techniques, and algorithms (e.g., decision trees, Naive Bayes classification, support vector machines for classification problems, random forest for classification and regression, linear regression, least squares regression, logistic regression). In an embodiment, the AI component 220 may utilize transferrable neural networks algorithms and models (e.g., long short-term memory (LSTM), deep stacking network (DSN), deep belief network (DBN), convolutional neural networks (CNN), compound hierarchical deep models) that may be trained with supervised or unsupervised machine learning methods.

According to one embodiment, the feedback program 110a, 110b may also implement the AI component 220 to segment the recorded review session into excerpts containing content associated with specific artifacts and artifact elements (e.g., subcomponents of an artifact). In at least one embodiment, as the review session is recorded by the recording component 216, the AI component 220 may concurrently segment the recorded review session into the excerpts containing the identified artifacts. In this embodiment, the AI component 220 may continuously identify content referencing one or more artifacts as the review session progresses.

According to one embodiment, the AI component 220 may create a review session segment by creating indexes within the recorded review session that marks the start and end of an artifact topic discussion. In one embodiment, the AI component 220 may utilize natural language processing (NLP) to identify topic discussions in the review session and match those discussions in the review session to the names of artifacts and artifact elements (e.g., design/architecture artifacts and/or artifact elements) in an associated artifact management repository 214. In this embodiment, the AI component 220 may utilize NLP to identify a plurality of topics (e.g., design/architecture artifacts and elements identified by number, name, namespace, and other parameters including version, model, and component hierarchy) identified in the video, audio, and/or text contained in the recorded review session. For example, AI component 220 may parse text extracted from a chat or audio conversation in the review session and implement NLP techniques, such as, for example, syntactic analysis to identify parts of speech and syntactic relations between various portions of the extracted text. In this embodiment, the AI component 220 may convert the extracted audio into a textual format. In a further embodiment, the AI component 220 may utilize parts-of-speech tagging to identify the particular parts-of-speech of one or more words in the text based on its relationship with adjacent and related words. In an embodiment, the AI component 220 may utilize the aforementioned techniques to determine an associated topic for content contained in a review session segment.

In another embodiment, the AI component 220 may utilize video frame image analysis to identify referenced artifacts and segment the recorded review session based on the identified artifacts. For example, the AI component 220 may utilize object tracking to track a graphical object or notation in a graphical artifact (e.g., activity diagram) given its position in a frame extracted from the video data of the recorded review session. In this example, the AI component 220 may utilize a trained CNN to detect and identify graphical objects or notations within the recorded review session. Responsive to identifying the graphical object or notation, the AI component 220 may associate (e.g., provide a probability) the identified object or notation with an artifact. In these embodiments, the AI component 220 may utilize object recognition and NLP to segment the video of the recorded review session into a plurality of segments or clips that each reference a separate artifact. In a further embodiment, the AI component 220 may associate each segment of the recorded review session with the artifact management repository 214 and one or more artifacts contained in the artifact management repository 214.

According to one embodiment, the feedback program 110a, 110b may implement the tagging component 222 to generate a bi-directional tag, link (e.g., uniform resource locator (URL)), or any other association between the one or more recorded review session segments referencing an artifact and the referenced artifact stored in the associated artifact management repository 214. In one embodiment, the bi-directional tagging link may point into the artifact files at specific images, structured language sections, or any other artifact element and from there to segments of the recorded review session referring to that artifact.

According to one embodiment, the tagging component 222 may tag segments (e.g., timestamps) of the recorded review session with one or more artifact information, such as, for example, a name of the artifact, a number identifier of the artifact (e.g., GUID), a namespace of the artifact, a version of the artifact, a model associated with the artifact, and a component hierarchy associated with the artifact. In one embodiment, the tagged recording segments may also include a link (e.g., URL) to the associated artifact management repository 214. According to one embodiment, the tagging component 222 may tag the referenced artifacts (stored in an associated artifact management repository 214) with a link (e.g., URL to specific timestamps) to the recorded review session. According to one embodiment, the feedback program 110a, 110b may continue to update the bi-directional deep tags/links as artifact development continues. In this embodiment, the tagging component 222 may dynamically update previously tagged recorded review sessions based on changes to one or more artifact management repositories 214. Further, if a user views the recorded review session after changes have been made to a referenced artifact, the deep tagging may dynamically open the version of the referenced artifact that is pertinent to the recorded review session.

According to one embodiment, the feedback program 110a, 110b may implement the UX component 224 to generate and direct a user interface (UI) described with reference to FIGS. 4 to 8. In one embodiment, the UX component 224 may create a graphical representation of a tag embedded within the playback of the recorded review session. For example, the UX component 224 may superimpose the graphical representation of the tag on a progress bar of the recording playback tool 210 indicating an identified artifact and/or artifact element and the boundaries of the segment referencing that artifact and/or artifact element. In an embodiment, the UX component 224 may present only review session segments related to a specific artifacts or artifact management repositories 214. For example, responsive to a user providing an artifact title and/or GUID, the UX component 224 may remove all recording segments unrelated to the artifact title/GUID and may only present the remaining relevant segments to the user. In an embodiment, the UX component 224 may present only session segments that a user may be allowed to view dictated by a security role or profile associated with the user, project permissions, and user permissions. In another embodiment, the UX component 224 may adjust the presentation of a tagged segment based on one or more labels associated with associated artifact. For example, if a tagged segment is associated with an artifact labeled with a priority label, the UX component 224 may add a red filter or other graphical notation to the presented tag representing the level of priority.

According to one embodiment, responsive to a user clicking or selecting a presented tag in the recording playback tool 210, the UX component 224 may open the artifact tool 208, on a computing device associated with a user, and direct the artifact tool 208 to navigate to the artifact or artifact element (e.g., graphical notation in a diagram artifact) associated with the artifact referenced at that recording segment. According to one embodiment, as the user interacts with the artifact displayed in the artifact tool 208, the feedback program 110a, 110b may implement the UX component 224 to simultaneously display recorded review session segments associated with the displayed artifact. In one embodiment, the UX component 224 may present the recorded review session segment associated with the displayed artifact (e.g., via artifact tool 208) in a pop out playback tool (e.g., of recording playback tool 210) overlayed on top of the artifact tool 208.

According to one embodiment, the UX component 224 may annotate an artifact or artifact element (e.g., graphical notation in a diagram artifact) within the artifact tool 208 with a comment box incorporating a link to a specific timestamp of the recorded review session to enable the user to understand the comment in the correct context. In one embodiment, the UX component 224 may also include in the comment box, a short textual feedback and/or thumbnail image extracted from the recording.

Figure 3:
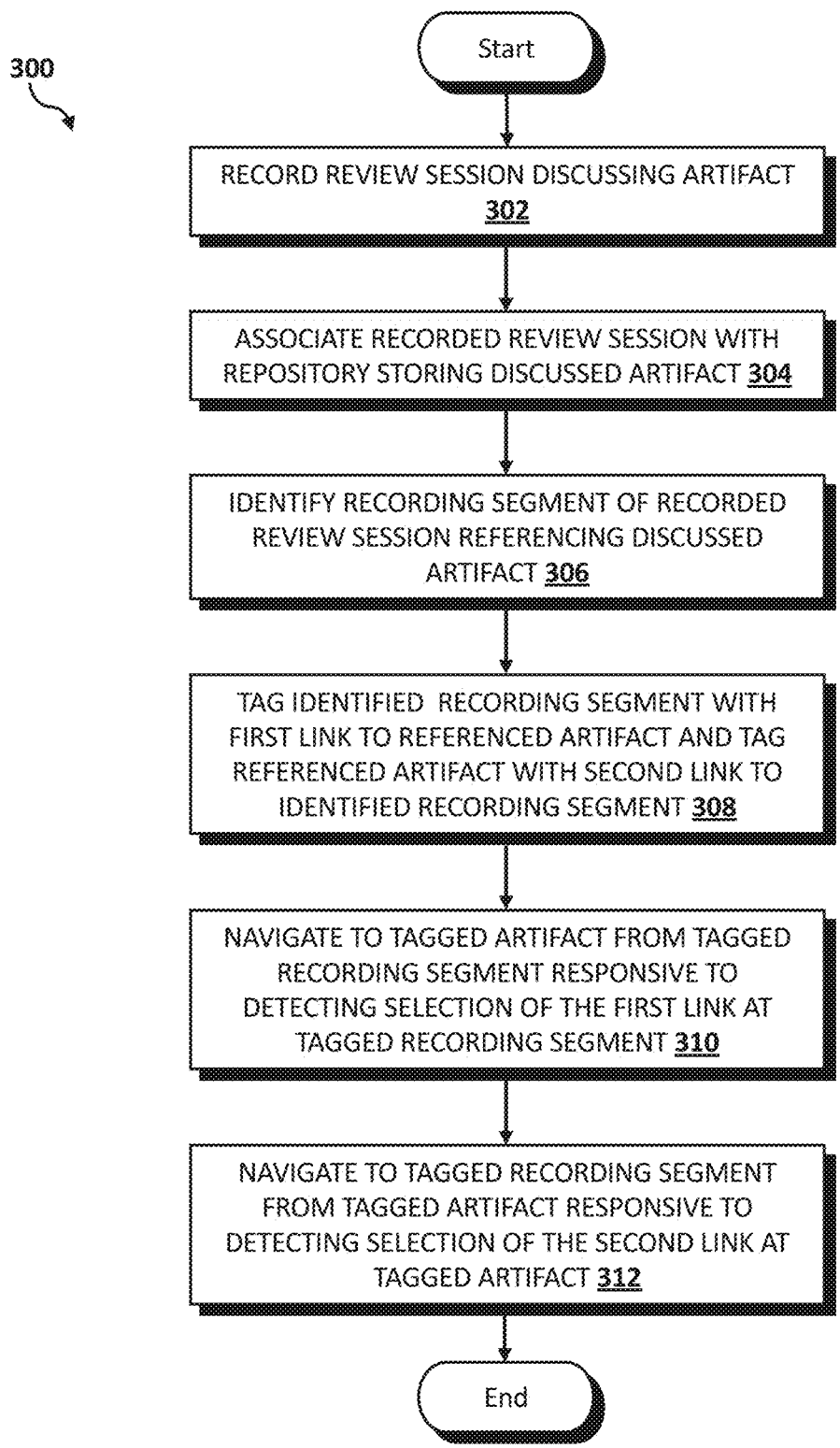
FIG. 3 is an operational flowchart illustrating a feedback process according to at least one embodiment.

In another embodiment, the UX component 224 may enable a user to search an archive of historical review sessions (e.g., in recording storage 212) for specific segments. In one embodiment, the UX component 224 may return and present a set of all recorded review session segments associated with a particular artifact or artifact management repository 214. In an embodiment, the feedback program 110a, 110b may continue to track and update tagged artifacts responsive to changes in a corresponding artifact management repository 214. Referring now to FIG. 3, an operational flowchart illustrating the exemplary feedback process 300 used by the feedback program 110a and 110b according to at least one embodiment is depicted. The feedback process 300 may be understood with reference to FIG. 2, discussed above, and illustrated further with reference to FIGS. 4 to 8, as will be further detailed below.

According to one embodiment, at 302, a review session discussing an artifact is recorded. As described previously, the artifact may refer to an architecture artifact and/or a design artifact associated with a software development project. These artifacts may include intermediate/final work products or by-products of the software development project. According to one embodiment, the feedback program 110a, 110b may implement a recording component to record a review session (e.g., audio and/or video conference) conducted via a web conference tool, as described previously with reference to FIG. 2.

According to one embodiment, at 304, the recorded review session is associated with a repository storing the discussed artifact. According to one embodiment, the feedback program 110a, 110b may associate a recorded review session with one or more artifact management repositories storing the discussed or referenced artifacts. In an embodiment, the feedback program 110a, 110b may identify one or more artifact management repositories related to the recorded review session by comparing and matching the list of all invited participants in the meeting invite (e.g., via calendar tool 204) and/or participants in the recorded review session with a list of contributors associated with one or more artifact management repositories. In another embodiment, the feedback program 110a, 110b may enable a user, contributor, and/or participant to provide the related artifact management repository as part of the meeting details when scheduling the review session, as described previously with reference to FIG. 2.

According to one embodiment, at 306, a recording segment of the recorded review session referencing the discussed artifact is identified. According to one embodiment, the feedback program 110a, 110b may implement AI techniques to identify the artifacts referenced during the recorded review session and generate a detailed association between those recording segments with the artifact management repository, as described previously with reference to FIG. 2.

According to one embodiment, at 308, the identified recording segment is tagged with a first link to the referenced artifact and the referenced artifact is tagged with a second link to the identified recording segment. According to one embodiment, the feedback program 110a, 110b may generate a bi-directional link between the one or more recording segments discussing an artifact and the referenced artifact stored in the associated artifact management repository 214, as described previously with reference to FIG. 2. In one embodiment, the tagged recording segments (e.g., recording segments identified as discussing artifacts) may include the first link (e.g., URL) configured to enable navigation from the tagged recording segments (e.g., from recording playback tool 210) to the artifacts (e.g., via artifact tool 208) referenced in the tagged recording segments. In one embodiment, the feedback program 110a, 110b may superimpose a graphical representation of the tag on a progress bar of the recording playback tool 210 displaying the recorded review session, as described previously with reference to FIG. 2. In one embodiment, the graphical representation of the tag may indicate the identified recording segment discussing an artifact and the boundaries of the recording segment discussing that artifact.

In another embodiment, the tagged artifacts (e.g., artifacts referenced in the identified recording segments) may include the second link (e.g., URL) configured to enable navigation from the tagged artifact (e.g., from artifact tool 208) to the tagged recording segments (e.g., recording segments identified as discussing artifacts) via the recording playback tool 210. According to one embodiment, the feedback program 110a, 110b may annotate (e.g., in the artifact tool 208) the tagged artifact or artifact element (e.g., graphical notation representing a subcomponent of a diagram artifact) with a comment box incorporating the second link to a specific timestamp (e.g., recording segment) of the recorded review session to enable the user to understand the comment in the correct context, as described previously with reference to FIG. 2.

According to one embodiment, at 310, in response to detecting a selection of the first link at the tagged recording segment, the user is navigated to the tagged artifact from the tagged recording segment. According to one embodiment, responsive to a user clicking or selecting a presented graphical representation of the tag in the recording playback tool 210, the feedback program 110*a*, 110*b* may open the artifact tool 208 (e.g., artifact viewing/editing tool) and direct the artifact tool 208 to navigate to the tagged artifact corresponding to the artifact referenced at recording segments including the first link in the recorded review session.

According to one embodiment, at 312, in response to detecting a selection of the second link at the tagged artifact, the user is navigated to the tagged recording segment from the tagged artifact. According to one embodiment, responsive to a user clicking or selecting the second link in the artifact tool 208, the feedback program 110*a*, 110*b* may open the recording playback tool 210 and direct the recording playback tool 208 to navigate to the tagged recording segment corresponding to the timestamp where the recording segment refers to the tagged artifact.

Referring now to FIGS. 4-8, schematic block diagrams 400, 500, 600, 700, and 800 illustrating an exemplary implementation of the feedback process 300 used by the feedback program 110*a*, 110*b*, according to at least one embodiment is depicted.

Figure 4:
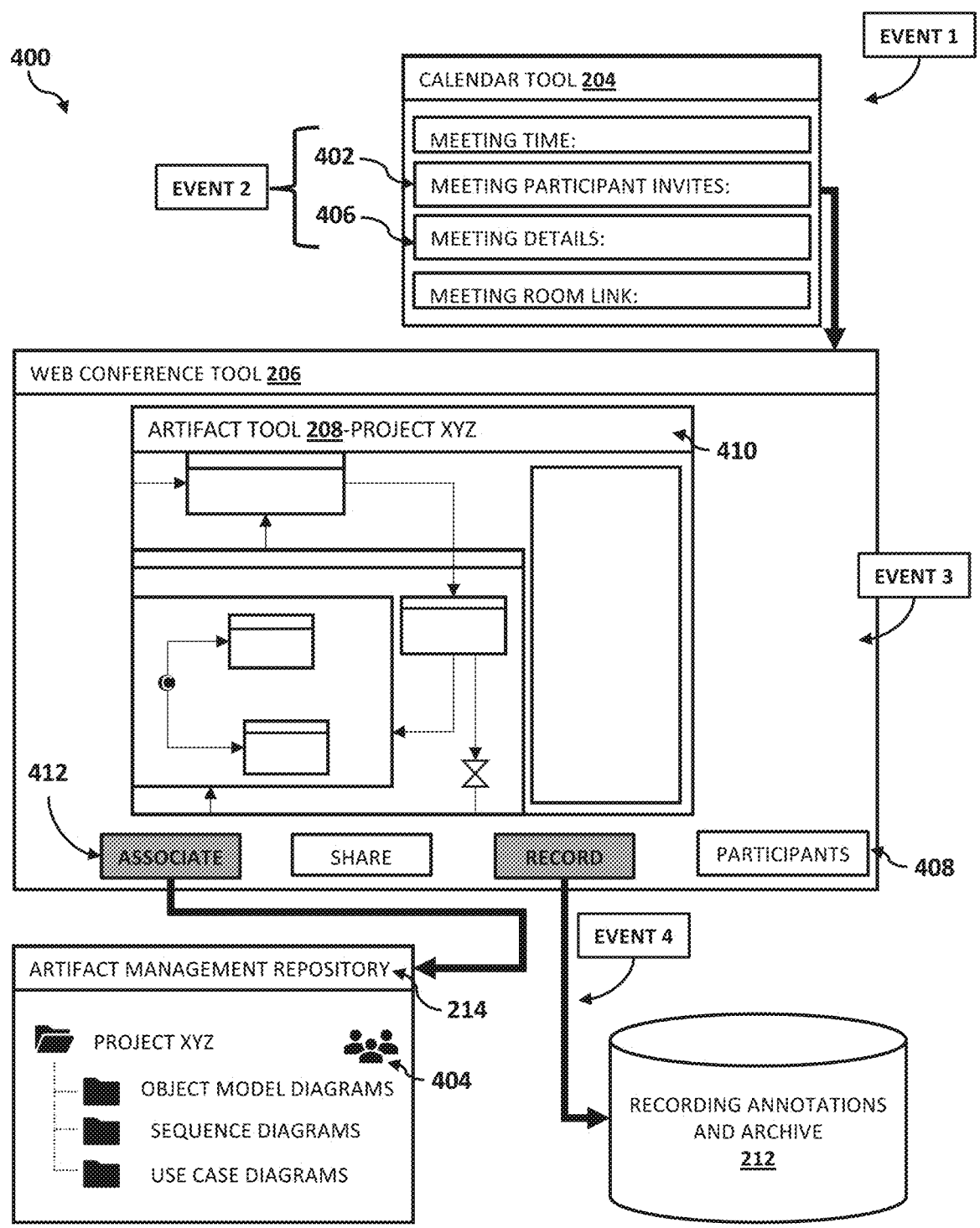
FIG. 4 is schematic block diagram illustrating a first exemplary implementation of the feedback process depicted in FIG. 3 according to at least one embodiment.

Referring first to FIG. 4, according to one embodiment, the calendar tool 204 may enable a user to schedule a review session (e.g., web conference) at event 1.

According to one embodiment, at event 2, the feedback program 110*a*, 110*b* may interact with the calendar tool 204 to generate an association between the scheduled review session and an artifact management repository 214. For example, the feedback program 110*a*, 110*b* compare a listing of meeting participant invites 402 in the calendar tool 204 against a listing of contributors 404 in one or more artifact management repositories 214. In another example, the calendar tool 204 may enable a user, contributor, and/or participant to provide the related artifact management repository 214 as part of a meeting details input 406, which may be read by the feedback program 110*a*, 110*b*.

According to one embodiment, at event 3, the web conference tool 206 may enable a user to coordinate, present, and record a review session (e.g., web conference) with one or more participants 408. In one embodiment, the review session may include one or more participants 408 sharing (e.g., via share screen option) and reviewing one or more artifacts 410. For example, a user may share a screen displaying a diagram artifact (e.g., artifact 410) in the artifact tool 208 (e.g., visual modeling tool). Also at event 3, the feedback program 110*a*, 110*b* may identify one or more artifact management repositories 214 related to the review session by comparing the group of participants 408 joined in the review session with the listing of contributors 404 in one or more artifact management repositories 214 to identify a match. In another embodiment, the web conference tool 206 may include an associating option 412 which may enable a user, contributor, and/or participant to manually provide the related artifact management repository 214.

According to one embodiment, at event 4, the feedback program 110*a*, 110*b* may store the recorded review session in a recording storage 212 (e.g., recording annotations and archive storage). According to one embodiment, also at event 4, the feedback program 110*a*, may apply AI techniques to identify the one or more artifacts discussed or referred to within the recorded review session and associate those identified recording segments discussing the artifacts with the corresponding artifacts contained in the artifact management repository 214. According to one embodiment, the feedback program 110*a*, 110*b* may parse text extracted from a chat or audio conversation in the recorded review session and implement NLP techniques, such as, for example, syntactic analysis to identify parts of speech and syntactic relations between various portions of the extracted text to determine an associated topic for content contained in a review session segment. In another embodiment, the feedback program 110*a*, 110*b* may utilize video frame image analysis to identify referenced artifacts and segment the recorded review session based on the identified artifacts. For example, the feedback program 110*a*, 110*b* may utilize object tracking to track a graphical object or notation in a diagram artifact (e.g., activity diagram) given its position in a frame extracted from the video data of the recorded review session.

In one embodiment, the solution vectors output by the feedback program 110*a*, 110*b* may include one or more recorded review session segments and their corresponding artifact management repositories 214, and artifacts or artifact elements indicated with probabilistic values. In one embodiment, the above output may be stored with the recorded review session in the recording storage 212.

Figure 5:
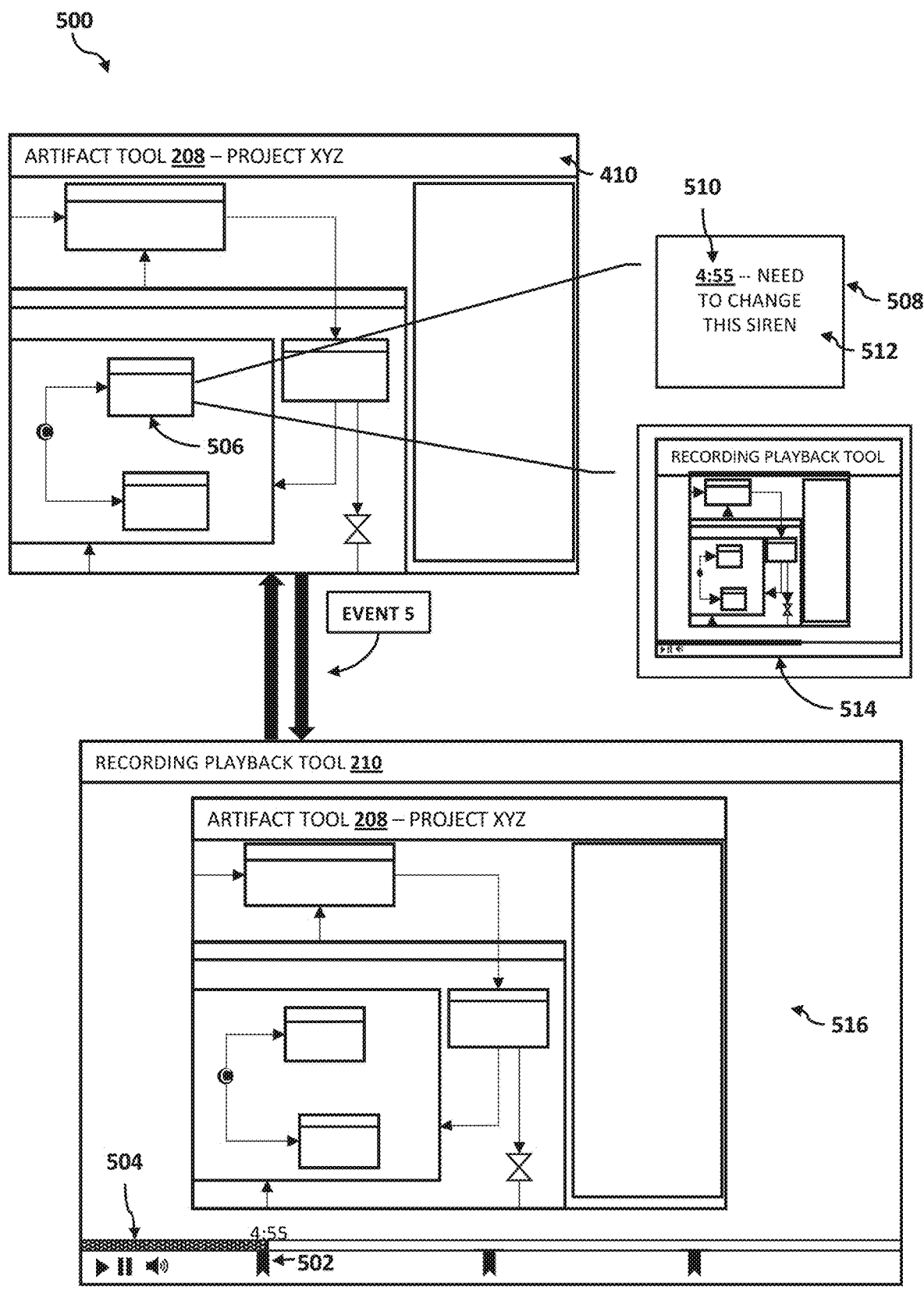
FIG. 5 is schematic block diagram illustrating a second exemplary implementation of the feedback process depicted in FIG. 3 according to at least one embodiment.

Referring now to FIG. 5, at event 5, the feedback program 110*a*, 110*b* may perform deep tagging to generate a bi-directional link between the recorded review session 516 and the artifact 410. Specifically, the feedback program 110*a*, 110*b* may generate a first link from a recording segment of the recorded review session 516 (e.g., playing in the recording playback tool 210) to the corresponding artifact 410 and a second link from the corresponding artifact 410 to the recording segment of the recorded review session 516 (e.g., in the recording playback tool 210).

According to one embodiment, the feedback program 110*a*, 110*b* may implement a graphical representation of a tag embedded within the playback of the recorded review session 516. For example, the feedback program 110*a*, 110*b* may superimpose one or more tag notations 502 (e.g., the graphical representation of the tag) on a progress bar 504 of the recording playback tool 210 indicating an identified artifact referenced at that timestamp. In some embodiments, the tag notation 502 may also indicate the boundaries of the recording segment discussing that artifact.

According to one embodiment, the feedback program 110*a*, 110*b* may direct the artifact tool 208 to annotate the artifact 410 referenced in the recorded review session 516. In one embodiment, the annotation may be applied to a specific artifact element (e.g., subcomponent) of the artifact 410 (e.g., graphical notation 506 in a diagram artifact) if the artifact element is referenced in the recorded review session 516. In at least one embodiment, the annotation may be presented as a comment box 508 incorporating a tag or link 510 to a specific recording segment (e.g., "4:55" timestamp in FIG. 5) of the recorded review session 516 (e.g., corresponding to tag notation 502 in recording playback tool 210). In one embodiment, the feedback program 110*a*, 110*b* may also include in the comment box 508, a short textual feedback 512 extracted (e.g., via NLP) from the recording segment discussing the artifact. In another embodiment, the feedback program 110*a*, 110*b* may also include, as part of the annotation, a thumbnail image 514 of the recording segment extracted from the recorded review session 516. In some embodiments, the thumbnail image 514 may include an embedded link (e.g., link 510) such that a user may click on the thumbnail image 514 to open the corresponding recording segment via the recording playback tool 210. In at least one embodiment, if the recorded review session 516 discusses multiple artifacts or artifact elements, the feedback program 110*a*, 110*b* may annotate each of those artifacts or artifact elements as described with reference to event 5.

Figure 6:
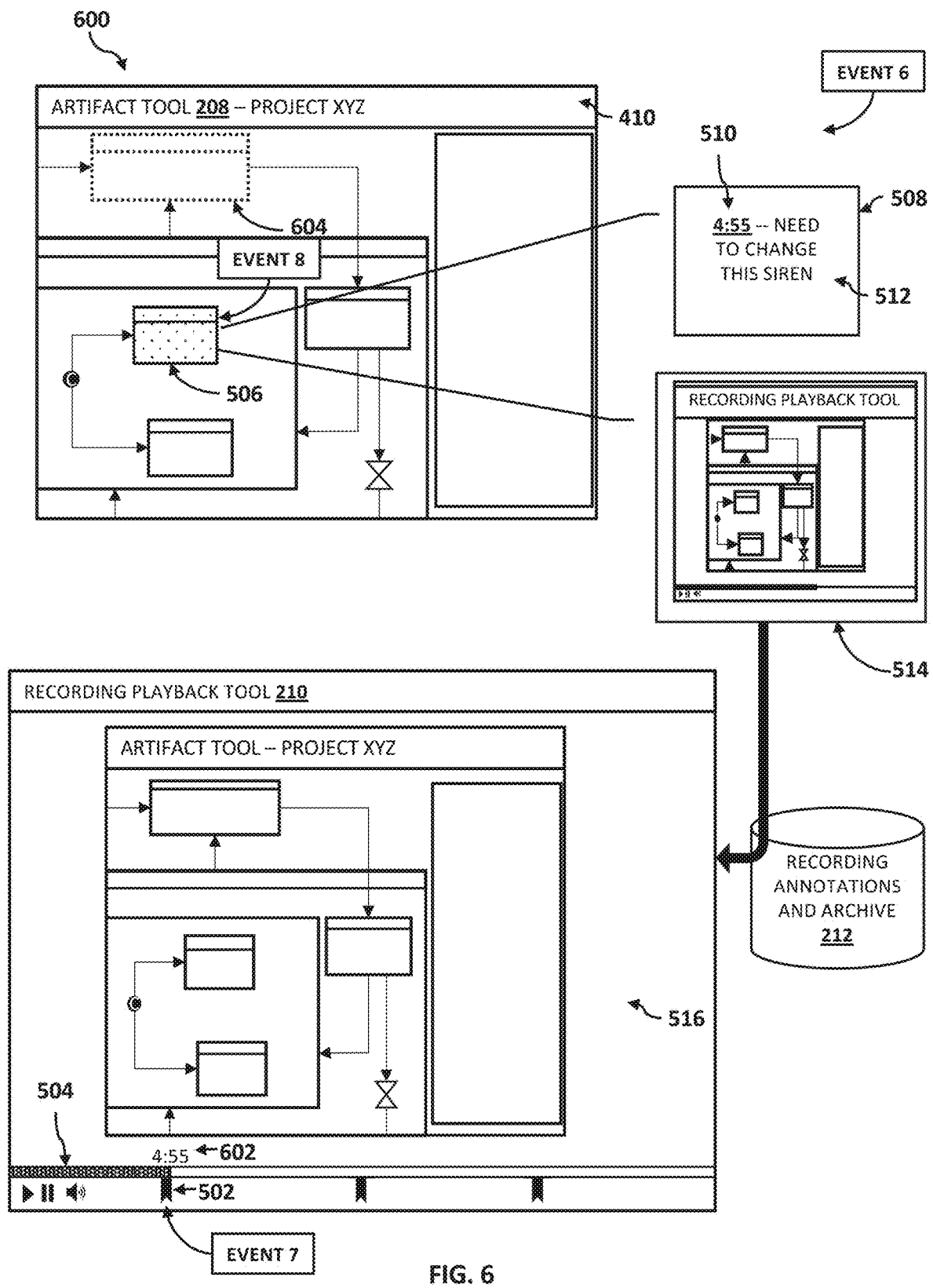
FIG. 6 is schematic block diagram illustrating a third exemplary implementation of the feedback process depicted in FIG. 3 according to at least one embodiment.

Referring now to FIG. 6, at event 6, a user may select, via the UI, a specific artifact element (e.g., graphical notation 506) to see any relevant comments (e.g., 512; 514) extracted from the recorded review session 516 as an annotation. At event 6, if the user selects graphical notation 506, representing the artifact element of interest to the user, the feedback program 110a, 110b may display the comment box 508 incorporating the link 510 to the specific recording segment (e.g., timestamp 602) in the recorded review session. In various embodiments, the annotation may also include one or more artifact information (e.g., name of artifact, version of artifact). In one embodiment, the feedback program 110a, 110b may also generate, in either comment box 508 or another similar comment box, the thumbnail image 514 of the recording segment extracted from the recorded review session 516. Responsive to the user clicking or selecting link 510 or the thumbnail image 514, the feedback program 110a, 110b may open the recording playback tool 210 and direct the recording playback tool 210 to retrieve the recorded review session 516 from the recording storage 212 and navigate to the specific timestamp 602 of the recorded review session 516. Accordingly, the user may selectively watch/listen to excerpts from the recorded review session 516 discussing only the specific artifact elements of interest to the user.

Continuing with FIG. 6, according to one embodiment, at event 7, responsive to the user clicking or selecting one of the tag notation 502 (e.g., the graphical representation of the tag) on the progress bar 504 of the recording playback tool 210 indicating an identified artifact, the feedback program 110a, 110b may open the artifact tool 208 and direct the artifact tool 208 to navigate to or highlight the artifact element (e.g., graphical notation 506 in a diagram artifact) associated with the artifact information contained in the clicked tag notation 502.

Continuing with FIG. 6, according to one embodiment, at event 8, the feedback program 110a, 110b may provide the user with a customized view of the artifacts via the artifact tool 208. For example, an artifact element, such as graphical notation 506, which may be assigned to the user may be graphically indicated as assigned (e.g., the dotted pattern fill in 506 may represent an "assigned" color). Similarly, non-assigned artifact elements, such as, a graphical notation 604, may also be graphically indicated as not assigned (e.g., dotted dash type for 604 may represent a "not assigned" color). According to one embodiment, if a user has a registered interest (e.g., based on contributor profile; assigned tasks) in one or more of the artifacts identified in the recorded review session 516, the feedback program 110a, 110b may transmit a notification (e.g., via electronic mail) to the user regarding any new tags of interest (e.g., references to artifacts of interest).

Figure 7:
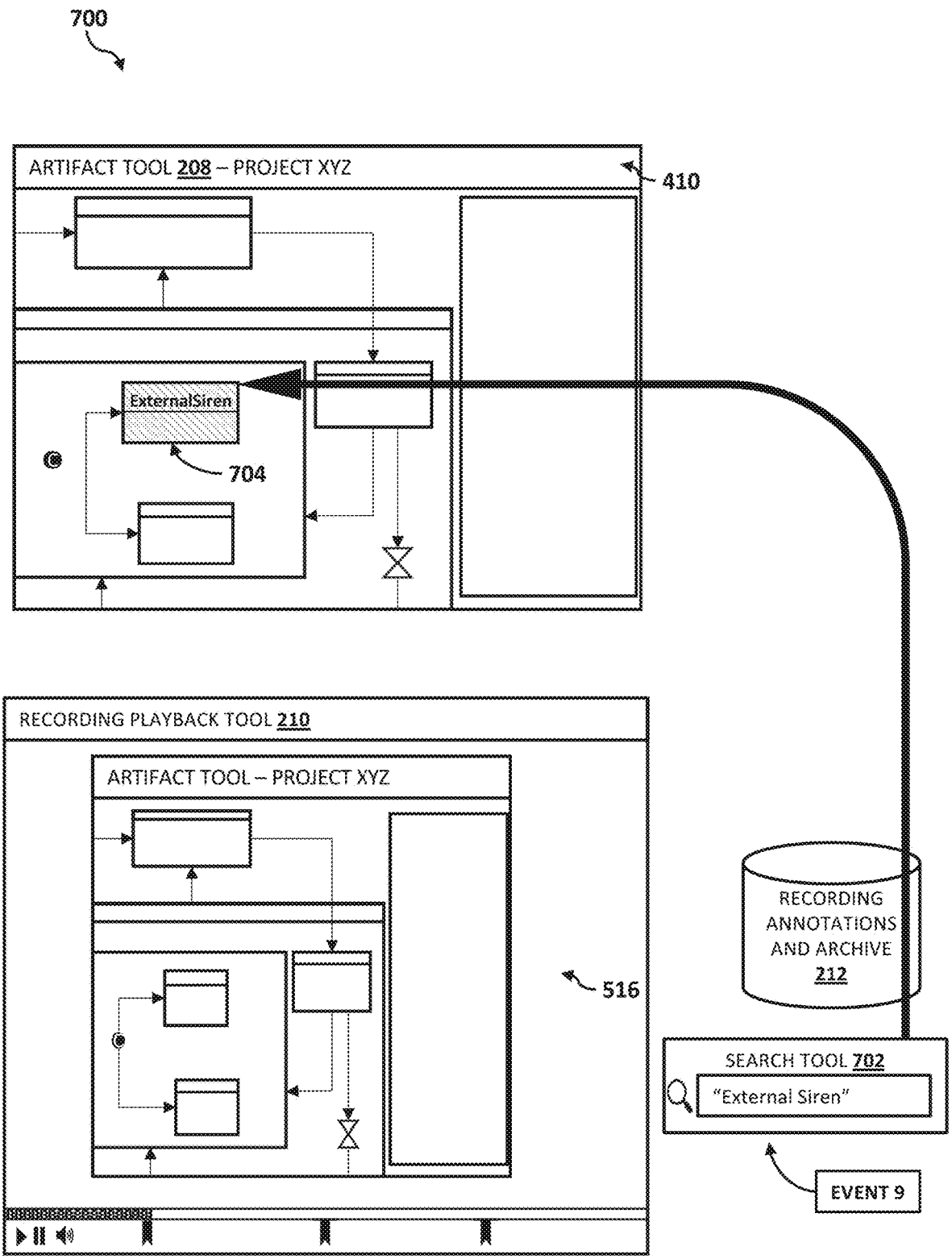
FIG. 7 is schematic block diagram illustrating a fourth exemplary implementation of the feedback process depicted in FIG. 3 according to at least one embodiment.

Referring now to FIG. 7, at event 9, a user may search the recording storage 212 (e.g., recording annotations and archive storage) for specific artifacts and/or artifact elements using a search tool 702 (e.g., part of UI implemented by feedback program 110a, 110b) associated with the recording storage 212. For example, using the search tool 702, the user may search for an artifact element named "External Siren" in artifact 410. The feedback program 110a, 110b may receive the search request for the specific artifact and direct the search tool 702 to locate the searched for artifact element in the recording storage 212 and may direct the artifact tool 208 to navigate to a graphical notation 704 representing the searched artifact element (e.g., "ExternalSiren").

Figure 8:
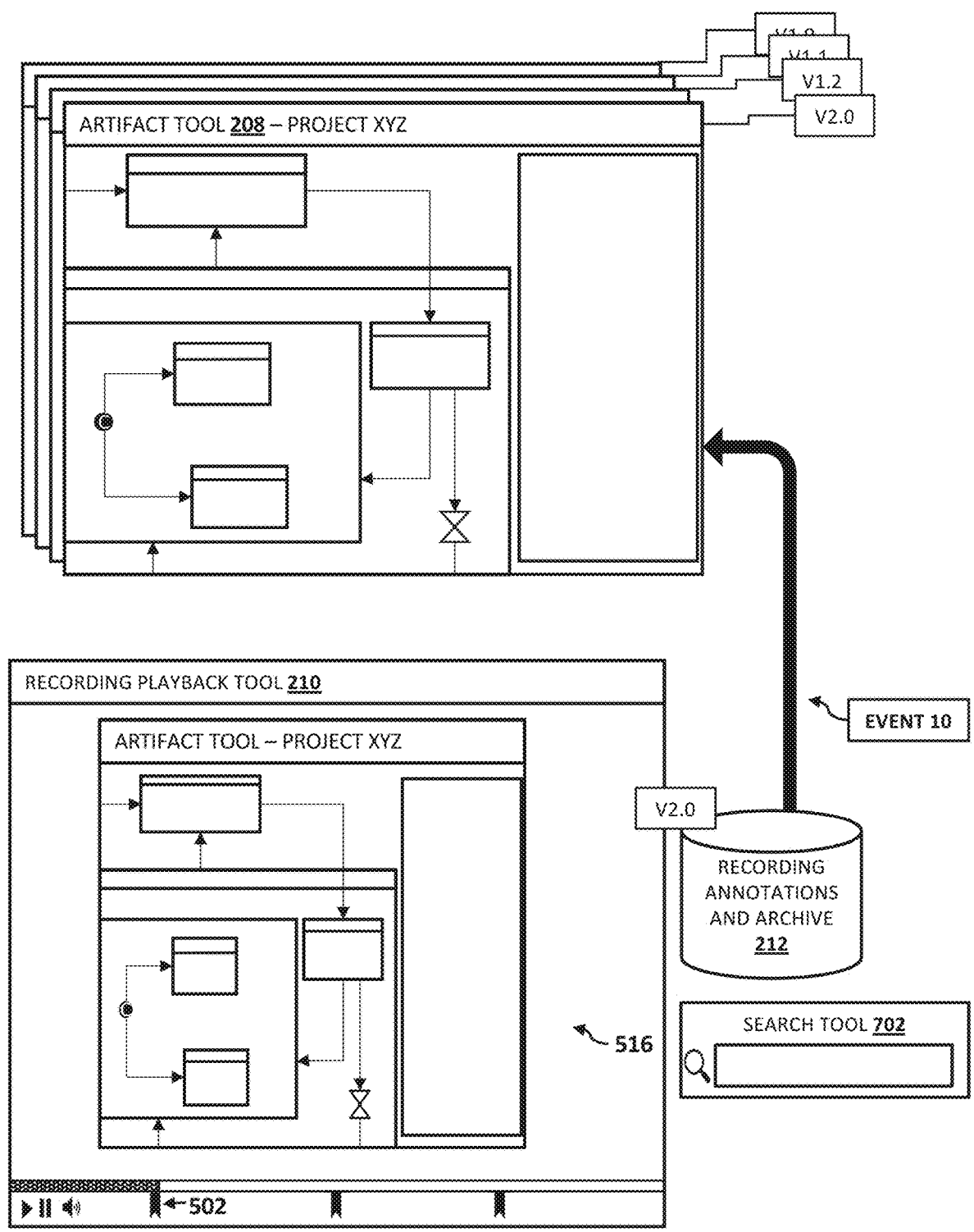
FIG. 8 is schematic block diagram illustrating a fifth exemplary implementation of the feedback process depicted in FIG. 3 according to at least one embodiment.

Referring now to FIG. 8, at event 10, if the user views a replay of the recorded review session 516 after one or more artifacts have been changed, the feedback program 110a, 110b may dynamically locate and navigate to a version of the artifact that is pertinent to the recorded review session 516. For example, the feedback program 110a, 110b may determine that a recorded review session 516 may be discussing or referencing version 2 of a given artifact and may associate the recorded review session 516 with that version of the artifact. Thereafter, responsive to the user playing the recorded review session 516 (associated with version 2) and clicking or selecting one of the tag notations 502 (e.g., the graphical representation of the tag) on the progress bar 504, the feedback program 110a, 110b may open the artifact tool 208 and direct the artifact tool 208 to navigate to version 2 of the artifact referenced in the recorded review session 516.

For at least the reasons detailed above, the functionality of a computer may be improved by the feedback program 110a, 110b. More specifically, the functionality of a computer may be improved because the feedback program 110a, 110b may enable the computer to automatically tag excerpts or segments of a recorded review session with links to the artifacts referenced therein. As such, the feedback program 110a, 110b may allow a computer to save considerable computational resources by only transferring and presenting content related to specific artifacts rather than transferring and presenting an entire recorded review session, allowing the computer to utilize the saved computational resources for other tasks.

It may be appreciated that FIGS. 2 to 8 provide only an illustration of one embodiment and do not imply any limitations with regard to how different embodiments may be implemented. Many modifications to the depicted embodiment(s) may be made based on design and implementation requirements.

Figure 9:
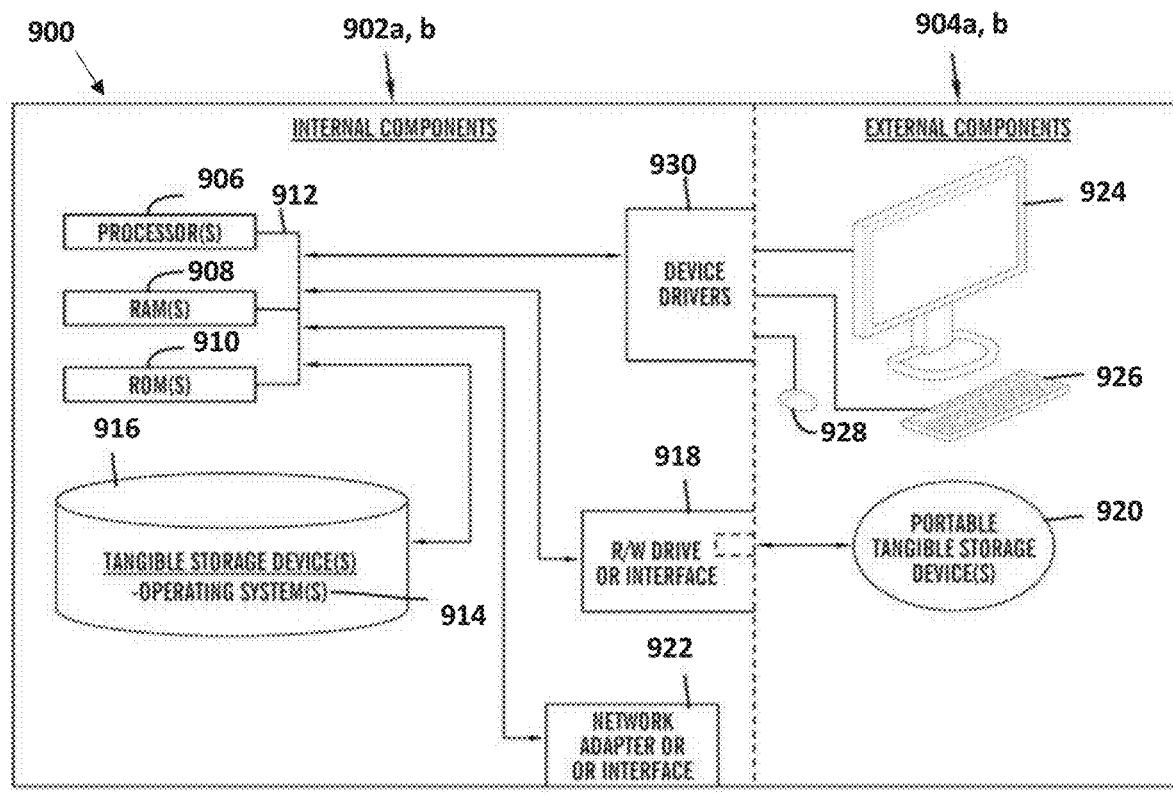
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 9. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the feedback program 110a in client computer 102, and the feedback program 110b in network server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the feedback program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the feedback program 110a in client computer 102 and the feedback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the feedback program 110a in client computer 102 and the feedback program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
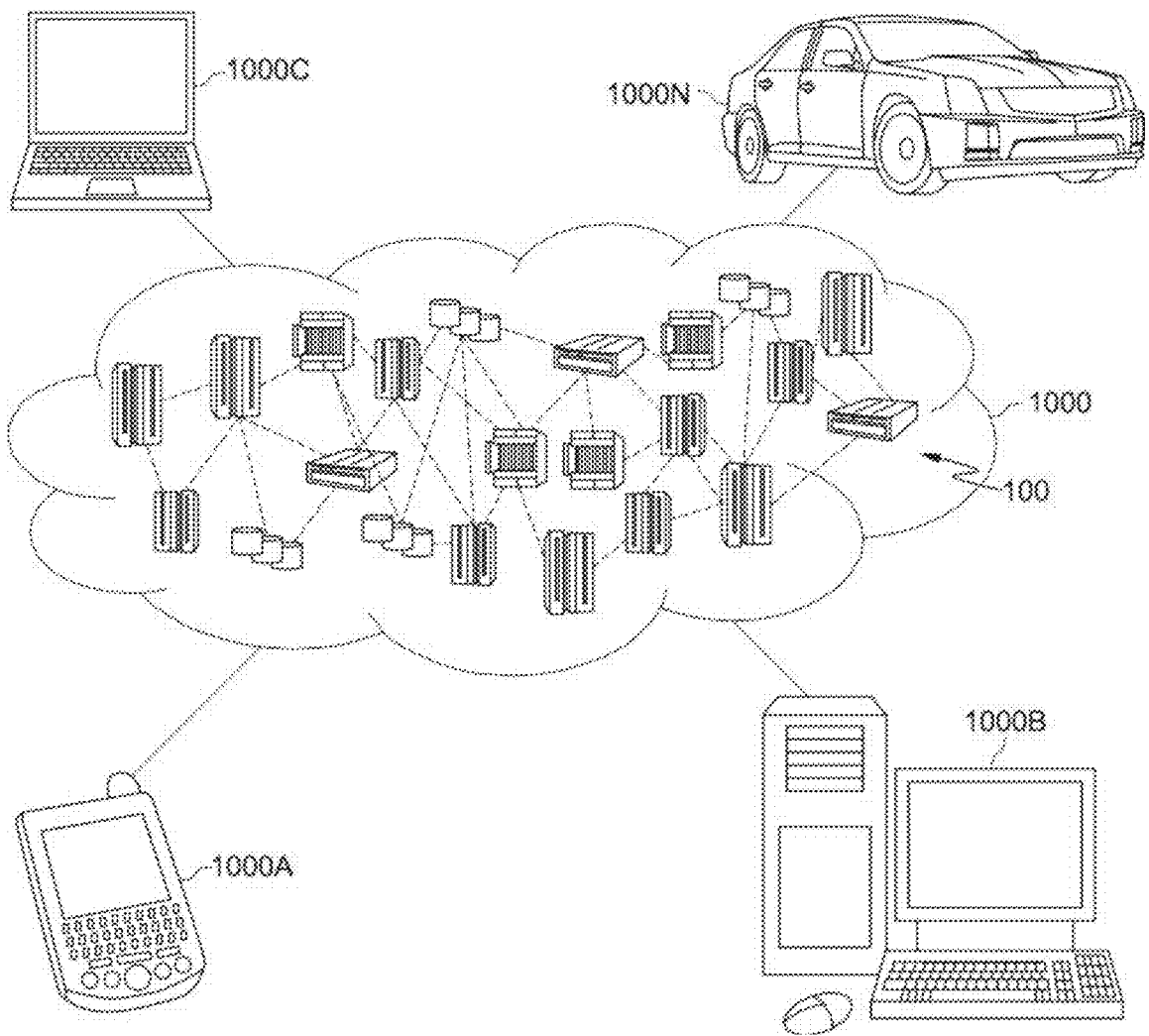
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
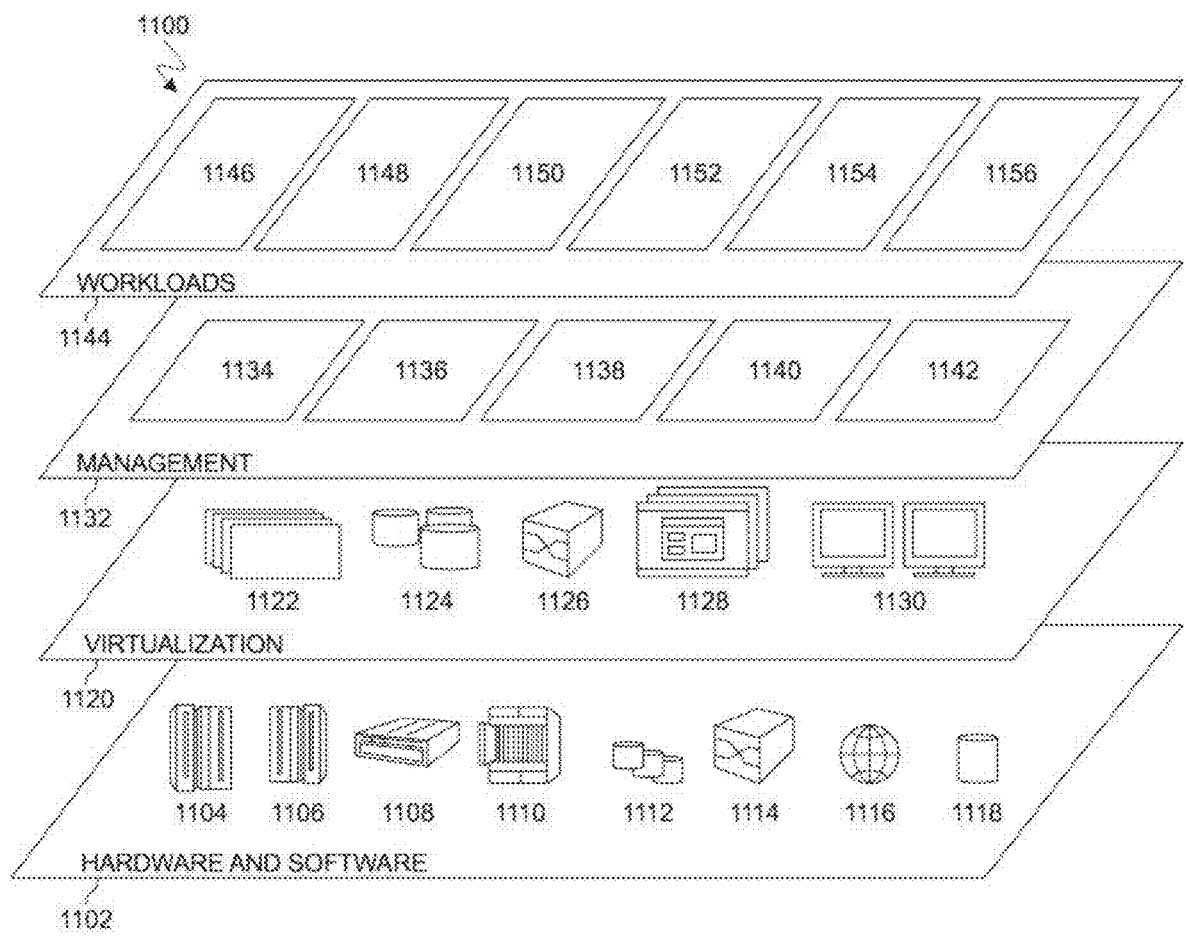
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and feedback processing 1156. A feedback program 110a, 110b provides a way to automatically create a bi-directional link between a recording segment referring to an artifact and the artifact to facilitate access to the artifact from the recording segment and to facilitate access to the recording segment from the artifact.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying a recording segment referencing an artifact in a recorded review session; and
    generating a bi-directional link between the identified recording segment and the referenced artifact;
    tagging the identified recording segment with a first link to the referenced artifact;
    tagging the referenced artifact with a second link to the identified recording segment;
    in response to detecting a selection of the first link at the tagged recording segment, navigating from the tagged recording segment to the tagged artifact referenced at the tagged recording segment; and
    navigating from a recording playback tool displaying the tagged recording segment to displaying the tagged artifact in an artifact tool.

2. The computer-implemented method of claim 1, further comprising:
    in response to detecting a selection of the second link at the tagged artifact, navigating from the tagged artifact to the tagged recording segment referencing the tagged artifact.

3. The computer-implemented method of claim 2, wherein navigating from the tagged artifact to the tagged recording segment referencing the tagged artifact further comprises:
    navigating from an artifact tool displaying the tagged artifact to displaying the tagged recording segment in a recording playback tool.

4. The computer-implemented method of claim 1, wherein tagging the identified recording segment with the first link to the referenced artifact further comprises:

presenting, in a playback of the recorded review session, a tag notation at a timestamp corresponding to the identified recording segment, wherein the tag notation includes the first link to the referenced artifact.

5. The computer-implemented method of claim 1, wherein tagging the referenced artifact with the second link to the identified recording segment further comprises:

annotating the referenced artifact with a comment box, wherein the comment box includes a text embedded with the second link to the identified recording segment.

6. The computer-implemented method of claim 1, further comprising:

identifying a match between a list of contributors to an artifact management repository and a group of participants in the recorded review session; and associating the artifact management repository with the recorded review session, wherein the artifact management repository includes the referenced artifact.

7. The computer-implemented method of claim 1, further comprising:

receiving a search request for a specific artifact; and in response to identifying the specific artifact in the recorded review session, directing a recording playback tool to play a corresponding recording segment referencing the specific artifact.

8. The computer-implemented method of claim 1, wherein the referenced artifact is selected from the group consisting of a design artifact and an architecture artifact.

9. A computer system for deep tagging a recorded review session, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

identifying a recording segment referencing an artifact in a recorded review session; and generating a bi-directional link between the identified recording segment and the referenced artifacts;

tagging the identified recording segment with a first link to the referenced artifact;

tagging the referenced artifact with a second link to the identified recording segment;

in response to detecting a selection of the first link at the tagged recording segment, navigating from the tagged recording segment to the tagged artifact referenced at the tagged recording segment; and navigating from a recording playback tool displaying the tagged recording segment to displaying the tagged artifact in an artifact tool.

10. The computer system of claim 9, further comprising:

in response to detecting a selection of the second link at the tagged artifact, navigating from the tagged artifact to the tagged recording segment referencing the tagged artifact.

11. The computer system of claim 10, wherein navigating from the tagged artifact to the tagged recording segment referencing the tagged artifact further comprises:

navigating from an artifact tool displaying the tagged artifact to displaying the tagged recording segment in a recording playback tool.

12. The computer system of claim 9, wherein tagging the identified recording segment with the first link to the referenced artifact further comprises:

presenting, in a playback of the recorded review session, a tag notation at a timestamp corresponding to the identified recording segment, wherein the tag notation includes the first link to the referenced artifact.

13. The computer system of claim 9, wherein tagging the referenced artifact with the second link to the identified recording segment further comprises:

annotating the referenced artifact with a comment box, wherein the comment box includes a text embedded with the second link to the identified recording segment.

14. A computer program product for deep tagging a recorded review session, comprising:

one or more computer-readable storage media and program instructions collectively stored on the one or more computer-readable storage media, the program instructions executable by a processor to cause the processor to perform a method comprising:

identifying a recording segment referencing an artifact in a recorded review session; and generating a bi-directional link between the identified recording segment and the referenced artifact;

tagging the identified recording segment with a first link to the referenced artifact;

tagging the referenced artifact with a second link to the identified recording segment;

in response to detecting a selection of the first link at the tagged recording segment, navigating from the tagged recording segment to the tagged artifact referenced at the tagged recording segment; and navigating from a recording playback tool displaying the tagged recording segment to displaying the tagged artifact in an artifact tool.

* * * * *